(12) United States Patent
Nilsson et al.

(10) Patent No.: US 10,523,299 B2
(45) Date of Patent: Dec. 31, 2019

(54) SHAPING OF TRANSMISSION BEAMS

(71) Applicant: Telefonaktiebolaget LM Ericsson (publ)

(72) Inventors: Andreas Nilsson, Göteborg (SE); Bo Hagerman, Morristown, NJ (US); Niklas Jaldén, Enköping (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/095,168

(22) PCT Filed: Apr. 27, 2016

(86) PCT No.: PCT/EP2016/059358
§ 371 (c)(1),
(2) Date: Oct. 19, 2018

(87) PCT Pub. No.: WO2017/186282
PCT Pub. Date: Nov. 2, 2017

(65) Prior Publication Data
US 2019/0149215 A1    May 16, 2019

(51) Int. Cl.
*H04B 7/06* (2006.01)
*H04B 17/309* (2015.01)
(Continued)

(52) U.S. Cl.
CPC .......... *H04B 7/0639* (2013.01); *H04B 7/0617* (2013.01); *H04B 17/15* (2015.01);
(Continued)

(58) Field of Classification Search
CPC ............. H04W 16/28; H04W 26/0083; H04W 72/046; H04B 7/0617; H04B 7/0695; H04B 7/0408; H04B 7/0456; H04B 7/024
See application file for complete search history.

(56) References Cited

U.S. PATENT DOCUMENTS 6,347,234 B1   2/2002  Scherzer
2006/0229103 A1*  10/2006  Monk ................ H04B 7/18506
                                                    455/562.1
(Continued)

FOREIGN PATENT DOCUMENTS

EP    2 928 099 A1    10/2015

OTHER PUBLICATIONS

International Search Report and Written Opinion of the International Searching Authority, PCT/EP2016/059358, dated Jan. 24, 2017, 12 pages.

(Continued)

*Primary Examiner* — David S Huang
(74) *Attorney, Agent, or Firm* — Sage Patent Group

(57) ABSTRACT

There is provided mechanisms for shaping transmission beams in a wireless communications network. A method is performed by a network node. The method comprises acquiring channel measurements for wireless devices served by radio access network nodes using current beam forming parameters and being controlled by the network node. The method comprises determining, based on the channel measurements, desired beam forming parameters for shaping the transmission beams for at least one of the radio access network nodes. The method comprises initiating a gradual change of the current beam forming parameters to the desired beam forming parameters for shaping the transmission beams for the at least one of the radio access network nodes. The gradual change causes a need for network controlled handover to occur for at least some of the wireless devices served by the radio access network nodes.

26 Claims, 10 Drawing Sheets

(51) Int. Cl.
    *H04B 17/15* (2015.01)
    *H04B 17/382* (2015.01)
    *H04B 17/373* (2015.01)
    *H04W 16/28* (2009.01)
    *H04W 36/30* (2009.01)
    *H04W 72/04* (2009.01)

(52) U.S. Cl.
    CPC ......... *H04B 17/309* (2015.01); *H04B 17/373* (2015.01); *H04B 17/382* (2015.01); *H04W 16/28* (2013.01); *H04W 36/30* (2013.01); *H04W 72/046* (2013.01)

(56) References Cited

U.S. PATENT DOCUMENTS

| | | | | |
|---|---|---|---|---|
| 2014/0064109 A1* | 3/2014 | Krishnamurthy | .... | H04J 11/0053 370/252 |
| 2014/0204902 A1* | 7/2014 | Maltsev | ............ | H04W 36/0083 370/331 |
| 2015/0131750 A1* | 5/2015 | Xue | ..................... | H04B 7/0482 375/267 |
| 2015/0280806 A1* | 10/2015 | Jalali | ..................... | H04W 40/22 370/316 |
| 2017/0311217 A1* | 10/2017 | Jung | ..................... | H04W 36/04 |

OTHER PUBLICATIONS

"3rd Generation Partnership Project; Technical Specification Group Radio Access Network; Study on next generation Self-Optimizing Network (SON) for UTRAN and E-UTRAN", (Release 12), 3GPP TR 37.822 V12.1.0 (Mar. 2015), XP050928007A, Mar. 21, 2015, 22 Pages.

* cited by examiner (a)

(b)

(c)

SHAPING OF TRANSMISSION BEAMS

CROSS REFERENCE TO RELATED APPLICATIONS

This application is a 35 U.S.C. § 371 national stage application of PCT International Application No. PCT/EP2016/059358 filed on Apr. 27, 2016 the disclosure and content of which is incorporated by reference herein in its entirety.

TECHNICAL FIELD

Embodiments presented herein relate to a method, a network node, a computer program, and a computer program product for shaping transmission beams in a wireless communications network.

BACKGROUND

In communications networks, there may be a challenge to obtain good performance and capacity for a given communications protocol, its parameters and the physical environment in which the communications network is deployed.

For example, future generations of cellular communications networks are expected to provide high data rates, up to several Giga bits per second (Gbps) whilst at the same time be energy efficient. One way to achieve such high data rates and/or to lower the energy consumption in cellular communications networks is to deploy reconfigurable antenna systems (RAS). In general terms, a RAS can be defined as an antenna system whose radiation characteristics can be changed by a network node in the communications networks after deployment and be adapted to, e.g., current traffic needs. For example, the antenna system can be reconfigured to better serve a traffic hotspot by, e.g., increasing the antenna gain toward the hotspot location. To efficiently use RAS it has to be automatically controlled, for example by using a self-organizing network (SON) mechanism. In reality the traffic distribution in many communications networks changes during the day, typically in predefined patterns. For example during office hours in weekdays most of the traffic is in office buildings and during the evenings most traffic is in residential buildings. Therefore it would be favorable to have different RAS settings for different time periods and to toggle between the RAS settings depending on the current traffic distribution.

The cell re-selection as define in the Long Term Evolution (LTE) family of telecommunications standards for wireless devices in radio resource control (RRC) idle mode is mainly based on the signal strength of Common Reference Signals (CRS) denoted CRS0 and CRS1. In short, the wireless devices measures received power of CRS from multiple radio access network nodes and choose the radio access network node(s) corresponding to the CRS with highest received power. If multiple antenna ports are used the cell re-selection of the wireless device could be based on the highest received signal strength of the CRS. The wireless devices may select to report only CRS0, i.e. the use of CRS1 can be optional and implementation dependent even in the case when multiple antenna ports are used by the radio access network nodes. For legacy wireless devices (supporting LTE up to Release 8 or 9), the CRSs (up to 4 CRSs) are also used at the wireless devices for determining a precoding matrix, rank and modulation and coding scheme for downlink data transmission.

Radio access network nodes can configure a wireless device in radio resource RRC connected mode to perform reference signal received power (RSRP) measurements from its serving radio access network node as well as searching and finding the strongest neighboring radio access network node(s). For example, the wireless devices can perform RSRP measurement every 40 ms for non-discontinuous reception (non-DRX) and during on-duration for discontinuous reception (DRX) cases. Furthermore, each wireless device can be capable of tracking 8 strongest cells simultaneously if the signal to interference plus noise ratio (SINR) is high enough, as described in further detail in 3GPP TS 36.133 version 8.2.0 Release 8.

Instantly switching the coverage areas of multiple radio access network nodes could lead to dropped calls and bad user experience for served wireless devices. One reason for this is that active wireless devices do not have a sufficient amount of time to perform handover from the currently serving radio access network node to the target serving radio access network node. This can lead to an increased probability for radio link failure (RLF). After a RLF the wireless device can try to connect to the network again by sending an RRCConnectionReestablishment request message to its serving radio access network node. However, if the serving radio access network node does not have the UE context (where UE is short for User Equipment, denoting the wireless device), the wireless device moves to RRC idle mode and the connection will be lost. The wireless device context is established at a radio access network node when the transition to RRC connected mode is completed for a wireless device or in the target radio access network node after completion of handover. Further, slowly changing the RAS setting for the respective cells in a random way from the current RAS settings to the new RAS setting can lead to unnecessary handovers during the switch and temporary coverage holes which, again, can lead to dropped users.

Hence, there is still a need for an improved handling of handovers in communications networks using RAS.

SUMMARY

An object of embodiments herein is to provide efficient mechanisms for handling of handovers in communications networks using RAS.

According to a first aspect there is presented a method for shaping transmission beams in a wireless communications network. The method is performed by a network node. The method comprises acquiring channel measurements for wireless devices served by radio access network nodes using current beam forming parameters and being controlled by the network node. The method comprises determining, based on the channel measurements, desired beam forming parameters for shaping the transmission beams for at least one of the radio access network nodes. The method comprises initiating a gradual change of the current beam forming parameters to the desired beam forming parameters for shaping the transmission beams for the at least one of the radio access network nodes. The gradual change causes a need for network controlled handover to occur for at least some of the wireless devices served by the radio access network nodes.

Advantageously this provides efficient handling of handovers in communications networks using RAS.

Advantageously this results in relatively few simultaneous handover signals being needed when performing a cell split (or cell merge), which will reduce the risk of radio link failure and dropped calls.

According to a second aspect there is presented a network node for shaping transmission beams in a wireless communications network. The network node comprises processing circuitry. The processing circuitry is configured to cause the network node to acquire channel measurements for wireless devices served by radio access network nodes using current beam forming parameters and being controlled by the network node. The processing circuitry is configured to cause the network node to determine, based on the channel measurements, desired beam forming parameters for shaping the transmission beams for at least one of the radio access network nodes. The processing circuitry is configured to cause the network node to initiate a gradual change of the current beam forming parameters to the desired beam forming parameters for shaping the transmission beams for the at least one of the radio access network nodes. The gradual change causes a need for network controlled handover to occur for at least some of the wireless devices served by the radio access network nodes.

According to a third aspect there is presented a network node for shaping transmission beams in a wireless communications network. The network node comprises processing circuitry and a computer program product. The computer program product stores instructions that, when executed by the processing circuitry, causes the network node to perform steps, or operations. The steps, or operations, cause the network node to acquire channel measurements for wireless devices served by radio access network nodes using current beam forming parameters and being controlled by the network node. The steps, or operations, cause the network node to determine, based on the channel measurements, desired beam forming parameters for shaping the transmission beams for at least one of the radio access network nodes. The steps, or operations, cause the network node to initiate a gradual change of the current beam forming parameters to the desired beam forming parameters for shaping the transmission beams for the at least one of the radio access network nodes. The gradual change causes a need for network controlled handover to occur for at least some of the wireless devices served by the radio access network nodes.

According to a fourth aspect there is presented a network node for shaping transmission beams in a wireless communications network. The network node comprises an acquire module configured to acquire channel measurements for wireless devices served by radio access network nodes using current beam forming parameters and being controlled by the network node. The network node comprises a determine module configured to determine, based on the channel measurements, desired beam forming parameters for shaping the transmission beams for at least one of the radio access network nodes. The network node comprises an initiate module configured to initiate a gradual change of the current beam forming parameters to the desired beam forming parameters for shaping the transmission beams for the at least one of the radio access network nodes. The gradual change causes a need for network controlled handover to occur for at least some of the wireless devices served by the radio access network nodes.

According to a fifth aspect there is presented a computer program for shaping transmission beams in a wireless communications network, the computer program comprising computer program code which, when run on a network node, causes the network node to perform a method according to the first aspect.

According to a sixth aspect there is presented a computer program product comprising a computer program according to the fifth aspect and a computer readable storage medium on which the computer program is stored.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
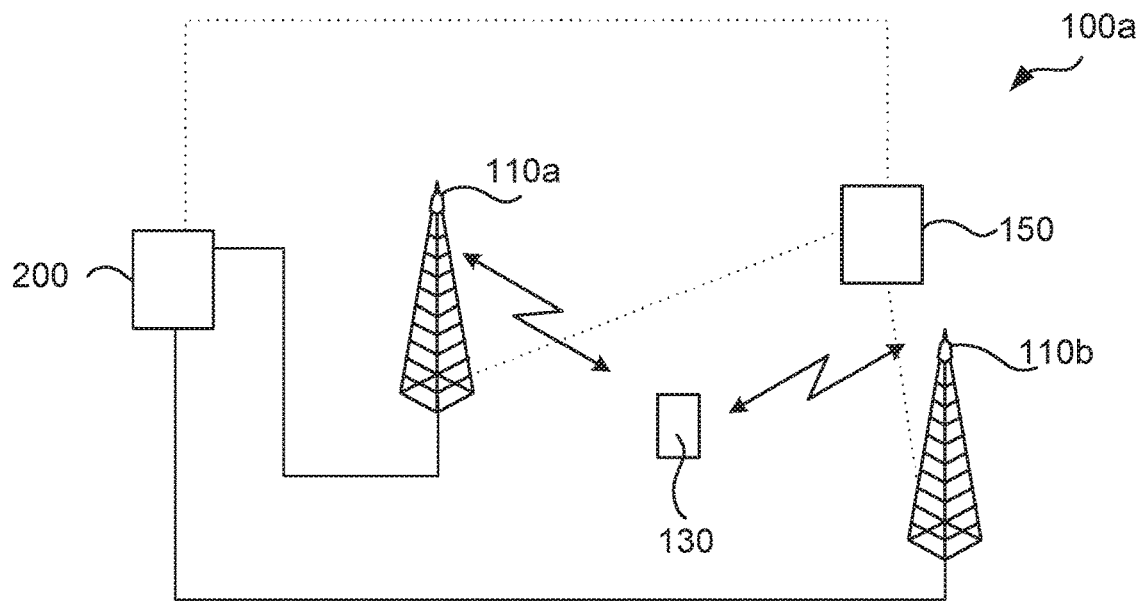
FIGS. 1a, 1b, 1c, and 1d are schematic diagrams illustrating wireless communications networks according to embodiments.

FIG. 1a is a schematic diagram illustrating a communications network 100a where embodiments presented herein can be applied. The communications network 100a comprises radio access network nodes 110a, 110b. The radio access network nodes 110a, 110b may be any combination of radio base stations such as base transceiver stations, node Bs, and/or evolved node Bs. The radio access network nodes 110a, 110b may further be any combination of macro radio access network nodes, and micro, or pico, radio access network nodes. Each radio access network nodes 110a, 110b provides network coverage in a respective coverage region (see, FIG. 1b) by transmitting transmission beams in that coverage region. Each such coverage region forms a cell. Hence, the wireless communications network 100a, may regarded as a cellular wireless communications network. Each radio access network nodes 110*a*, 110*b* is assumed to be operatively connected to a core network, as exemplified by one central network node 150. In some embodiments the central network node 150 is radio network controller (RNC). The central network node 150 may comprise, or be operatively connected to, a database. Such a database may store channel measurements. The core network may in turn be operatively connected to a service and data providing wide area network. The radio access network nodes 110*a*, 110*b* can further be operatively connected to a network node 200. The functionality of the network node 200, which may be a centralized network node, will be further disclosed below.

Hence, a wireless device 130 served by one of the radio access network nodes 110*a*, 110*b* may thereby access services and data as provided by the wide area network. The wireless devices 130 may be any combination of mobile stations, mobile phones, handsets, wireless local loop phones, user equipment (UE), smartphones, laptop computers, tablet computers, sensor devices, and/or modems.

Figure 1B:
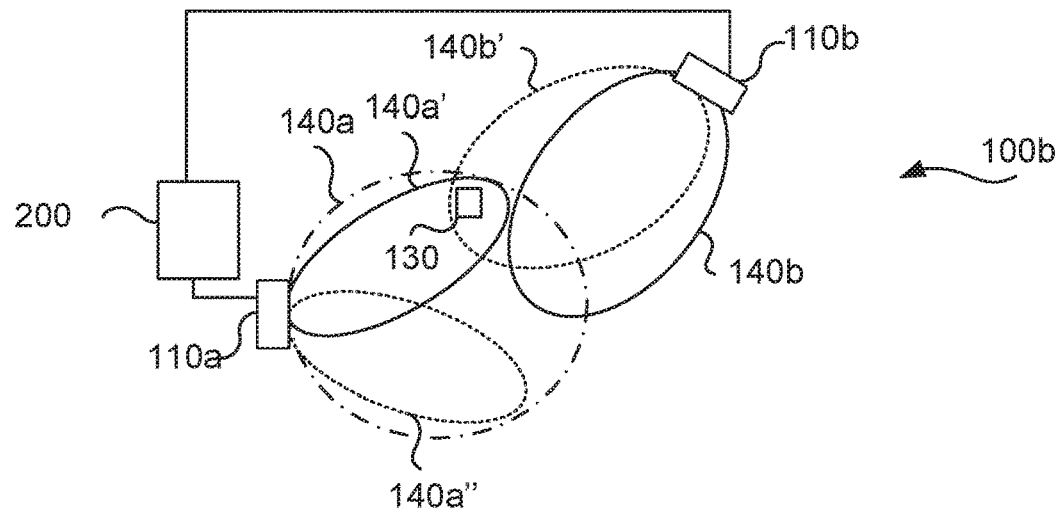

Further, in the illustrative example of FIG. 1*b* the coverage regions, or cells as defined by transmission beams 140*a*, 140*a*', 140*a*", 140*b*, 140*b*' of each radio access network node 110*a*, 110*b* have been schematically illustrated. Each transmission beam 140*a*, 140*a*', 140*a*", 140*b*, 140*b*' can be shaped by applying beam forming parameters at the radio access network nodes 110*a*, 110*b*.

By applying such beam forming, the transmission beams 140*a*, 140*a*', 140*a*", 140*b*, 140*b*' of the antenna at a radio access network node 110*a*, 110*b* may be controlled by transmitting a signal from a plurality of elements with an element specific gain and phase. In this way, transmission beams 140*a*, 140*a*', 140*a*", 140*b*, 140*b*' with different pointing directions and transmission and/or reception beam widths in both elevation and azimuth directions may be created. For example, transmission beam 140*a* may be reshaped, during a cell split or cell merge, as transmission beams 140*a*' and 140*a*", and transmission beam 140*b* may be reshaped (without cell split) as transmission beam 140*b*'.

A cell-split is typically performed during high traffic load with many active wireless devices 130 in order to increase the capacity in the system. Instantly/abruptly splitting one cell into two (or more) cells will cause a change in the cell coverage and hence the received signal level experienced by the served wireless devices 130, which in turn may lead to multiple simultaneous handovers which may lead to signaling overload and increased risk of radio link failure and dropped calls.

The embodiments disclosed herein therefore relate to mechanisms for shaping transmission beams 140*a*, 140*a*', 140*a*", 140*b*, 140*b*' in a wireless communications network 100*a*, 100*b*, 100*c*, 100*d*. In order to obtain such mechanisms there is provided a network node 200, a method performed by the network node 200, a computer program product comprising code, for example in the form of a computer program, that when run on a network node 200, causes the network node 200 to perform the method.

FIGS. 2-7 are flow charts illustrating embodiments of methods for shaping transmission beams 140*a*, 140*a*', 140*a*", 140*b*, 140*b*' in a wireless communications network 100*a*, 100*b*, 100*c*, 100*d*. The methods are performed by the network node 200. The methods are advantageously provided as computer programs 1020.

Figure 2:
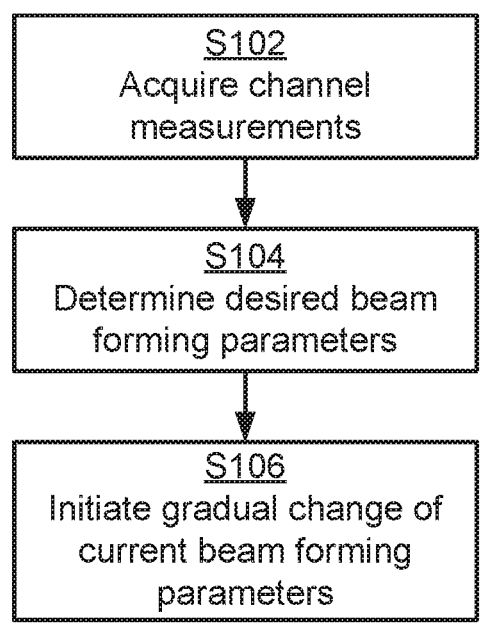
FIGS. 2, 3, 4, 5, 6, and 7 are flowcharts of methods according to embodiments

Reference is now made to FIG. 2 illustrating a method for shaping transmission beams 140*a*, 140*a*', 140*a*", 140*b*, 140*b*' in a wireless communications network 100*a*, 100*b*, 100*c*, 100*d* as performed by the network node 200 according to an embodiment.

S102: The network node 200 acquires channel measurements for wireless devices 130 served by radio access network nodes 110*a*, 110*b* using current beam forming parameters and being controlled by the network node. The network node 200 can acquire the channel measurements directly from the wireless devices 130, from the radio access network nodes 110*a*, 110*b*, or from a database.

S104: The network node 200 determines, based on the channel measurements, desired beam forming parameters for shaping the transmission beams 140*a*, 140*a*', 140*a*", 140*b*, 140*b*' for at least one of the radio access network nodes 110*a*, 110*b*. In this respect the determination in step S104 can involve the network node 200 to retrieve the desired beam forming parameters from a database, using the channel measurements as input. Hence, the desired beam forming parameters can be pre-stored in such a database.

S106: The network node 200 initiates a gradual change of the current beam forming parameters to the desired beam forming parameters for shaping the transmission beams 140*a*, 140*a*', 140*a*", 140*b*, 140*b*' for the at least one of the radio access network nodes 110*a*, 110*b*. The gradual change causes a need for network controlled handover to occur for at least some of the wireless devices 130 served by the radio access network nodes 110*a*, 110*b*. Hence, the handover of the at least some of the wireless devices 130 served by the radio access network nodes 110*a*, 110*b* is controlled by network node 200. As an example, the network node 200 can control the speed of which the current beam forming parameters are changed to the desired beam forming parameters in order to control how many of the wireless devices 130 are handed over during a given time interval. Hence, in this respect the wording network controlled handover can be interpreted as the network node 200 controlling how many of the wireless devices 130 are handed over during this given time interval. That is, the network node 200 can, by initiating the gradual change, thereby be configured to control how many of the wireless devices 130 are handed over per time unit. The given time interval can be regarded as starting when the gradual change is initiated and stopping when the gradual change is completed. That is, the given time interval can be regarded as running between when the gradual change is initiated and when the gradual change is completed. Further examples of how the network node 200 can cause the gradual change of the current beam forming parameters to the desired beam forming parameters for shaping the transmission beams 140*a*, 140*a*', 140*a*", 14*b*, 140*b*' will be disclosed below.

The network node 200 can thereby utilize known spatial information to each active wireless device 130 operatively connected to the radio access network nodes 110*a*, 110*b* to predict which wireless device 130 will end up in which cell after a cell split. The network node 200 can then initiate some handover procedures (i.e., handover procedures for some selected wireless devices 130) before the cell split actually starts and hence reduce the amount of simultaneous handover signaling after the cell split is completed.

Embodiments relating to further details of shaping transmission beams 140*a*, 140*a*', 140*a*", 140*b*, 140*b*' in a wireless communications network 100*a*, 100*b*, 100*c*, 100*d* as performed by the network node 200 will now be disclosed.

There may be different ways to define the beam forming parameters (both current and desired). According to some aspects the beam forming parameters define beam pointing directions. Hence, according to an embodiment the current beam forming parameters are associated with beam pointing in a first direction, and the desired beam forming parameters are associated with beam pointing in a second direction, different from the first direction. According to some aspects the beam forming parameters generate transmission beams. Hence, according to an embodiment the first direction is covered by a first transmission beam as generated by the current beam forming parameters, and the second direction is covered by a second transmission beam as generated by the desired beam forming parameters. According to some aspects the transmission beams are polarized and hence according to an embodiment the first transmission beam and the second transmission beam are transmitted using mutually orthogonal polarizations. That is, the first transmission beam is transmitted using a first polarization and the second transmission beam is transmitted using a second polarization, where the second polarization is different from the first polarization.

According to some aspects the beam forming parameters are defined by antenna weights. Hence, according to an embodiment the current beam forming parameters and the desired beam forming parameters are provided as beam forming weight vectors.

According to some aspects the transmission beams are the result of an initial cell split. Hence, according to an embodiment the first transmission beam and the second transmission beam are a result of an initial transmission beam covering at least partly the first transmission beam and the second transmission beam having been split. This could be the case in vertical sectorization. The cell split can typically be performed in two different ways: either one of the new sectors (where each sector is defined by one of the transmission beams) keeps the physical cell identifier (PCI) of the initial cell (as defined by the initial transmission beam) or both new sectors are provided with new PCIs. Each such new sector could define a new cell (hence the term cell split). For example, one advantage with keeping the PCI of the initial cell for one of the new sectors is that fewer handovers are needed after the cell split. One advantage with changing the PCI for both new sectors is that it will be easier for the network to handle mobility parameters that already have been optimized between different PCIs. Hence, according to an embodiment one of the first transmission beam and the second transmission beam has same PCI as the initial transmission beam.

The first transmission beam and the second transmission beam can be non-overlapping or partly overlapping. Further, although exemplifying a first transmission beam and a second transmission beam, this does not rule out the existence of at least one other transmission beam.

Figure 3:
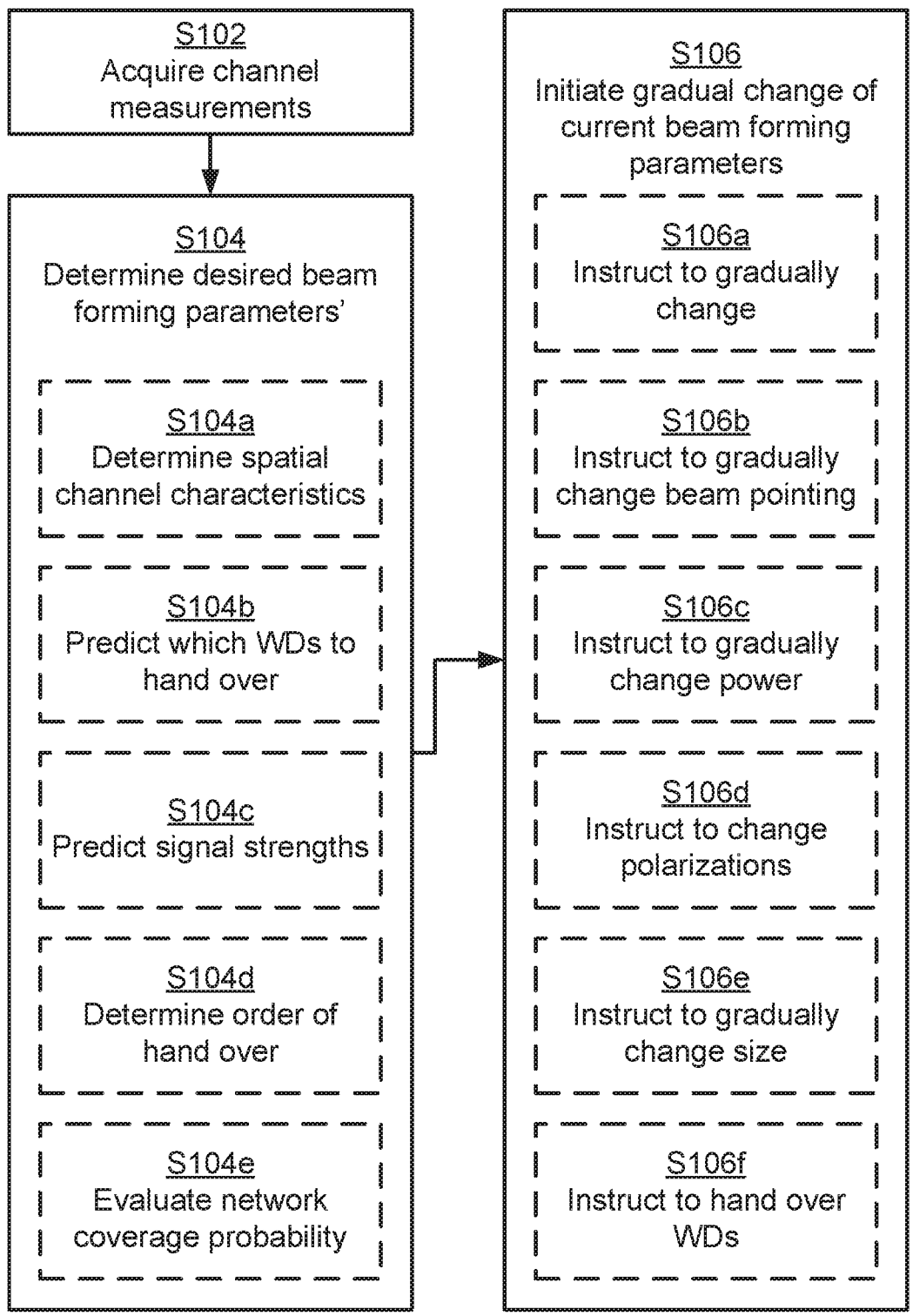

Reference is now made to FIG. 3 illustrating methods for shaping transmission beams 140a, 140a', 140a'', 140b, 140b' in a wireless communications network 100a, 100b, 100c, 100d as performed by the network node 200 according to further embodiments. It is assumed that steps S102, S104, and S106 are performed as described with reference to FIG. 2 and a thus repeated description thereof is therefore omitted.

There are different examples of channel measurements. For example, the network node 200 can obtain the channel measurement by instructing the radio access network nodes 110a, 110b to perform channel measurements based on sounding signals, such as uplink sounding reference signals (SRSs), from all served active wireless devices 130. Active wireless devices 130 continuously transmit SRSs so no extra transmission is needed. Hence, according to an embodiment the channel measurements are based on uplink sounding signals. Further, the network node 200 can be configured to determine spatial channel characteristics as in step S104a as part of determining the desired beam forming parameters in step S104:

S104a: The network node 200 determines spatial channel characteristics from the channel measurements.

The spatial channel characteristics can be exemplified by antenna covariance matrices. The antenna covariance matrix can be calculated for all antenna ports at the radio access network nodes 110a, 100b. That is, according to an embodiment the spatial channel characteristics for each of the at least one of the radio access network nodes 110a, 110b are represented by antenna covariance matrix for all antenna ports of this at least one of the radio access network nodes 110a, 110b.

The network node 200 can, for example by using the spatial channel characteristics, predict which wireless devices 130 that need to be handed over and hence be configured to perform step S104b as part of determining the desired beam forming parameters in step S104:

S104b: The network node 200 predicts which of the wireless devices 130 that needs to be handed over due to the current beam forming parameters being gradually changed.

In more detail, the network node 200 can be configured to use the antenna covariance matrices and the known antenna weights (that are used for generating the transmission beams) to determine which wireless device 130 will end up in which sector after the cell split has been done. Typically the wireless devices 130 will be operatively connected to the strongest cell, and hence by determining the estimated signal strength for each wireless device 130 to each of the radio access network node 110a, 110b, a simple signal level comparison will provide a good estimate of which radio access network node will be the target serving radio access network node for a particular wireless device 130o. The network node 200 can thus utilizes this knowledge to predict which wireless devices 130 that needs to perform a handover after the cell split and initiates these handovers already before the cell split has started.

Hence, the network node 200 can be configured to initiate the gradual change in step S106 by performing step S106f:

S106f: The network node 200 instructs at least one of the radio access network nodes 110a, 110b to initiate handover of those of the at least some of the wireless devices 130 that are served by the at least one of the radio access network nodes 110a, 110b.

In one another embodiment, the estimated signal strength of all wireless devices 130 in the new cells (to be created) is used for ordering the wireless devices 130 when to perform an eventual handover. For example the wireless devices 130 with the lowest estimated signal strength can be allowed and/or selected to perform the handover first to minimize the risk of radio link failure and dropped calls even further. Hence, the network node 200 can be configured to determine the desired beam forming parameters in step S104 by performing steps S104c and S104d: S104c: The network node 200 predicts signal strengths of the wireless devices 130 as if the desired beam forming parameters would have been used, without deploying the desired beam forming parameters.

S104d: The network node 200 determines an order for handing over the wireless devices 130 according to the signal strengths.

In yet another embodiment, the spatial channel information is used to optimize the overlap of the different sector lobes such that the SINR level for each of the wireless devices 130 is high enough to minimize the radio link failures.

In yet another embodiment, in the case of reusing PCI when splitting cells, the network node 200 can determine the cell that will carry the largest amount of wireless devices, and let this cell reuse the old PCI to minimize the number of handovers.

Further, the network node 200 can be configured to, before initiating the gradual change, check for backup to secure that no coverage holes appear as a result of the gradual change. Hence, the network node 200 can be configured to determine the desired beam forming parameters in step S104 by performing step S104*e*:

S104*e*: The network node 200 evaluates network coverage probability as if the desired beam forming parameters would have been used, without deploying the desired beam forming parameters. The desired beam forming parameters are determined such that at least a predetermined share of the wireless devices 130 is in service coverage.

Although the network node 200 in some aspects only initiates the gradual change, whereas the radio access network nodes 110*a*, 110*b* performs the actual gradual change, the network node 200 can be configured to instruct the radio access network nodes 110*a*, 110*b* to perform the actual gradual change and hence be configured to perform step S106*a* as part of initiating the gradual change in step S106:

S106*a*: The network node 200 instructs at least one of the radio access network nodes 110*a*, 100*b* to gradually change its current beam forming parameters to the desired beam forming parameters.

There can be different ways for the network node 200 to instructs the at least one of the radio access network nodes 110*a*, 100*b* to gradually change its current beam forming parameters to the desired beam forming parameters. For examples, the settings could be changed for one of the radio access network nodes 110*a*, 100*b* at a time, or simultaneously changed for all the radio access network nodes 110*a*, 100*b*. Hence, according to an embodiment where at least two of the radio access network nodes 110*a*, 110*b* are instructed, the at least two of the radio access network nodes 110*a*, 110*b* are instructed to change its current beam forming parameters to the desired beam forming parameters one at a time. According to another embodiment where at least two of the radio access network nodes 110*a*, 110*b* are instructed, all of the at least two of the radio access network nodes 110*a*, 110*b* are instructed to simultaneously change its current beam forming parameters to said desired beam forming parameters.

Further, the network node 200 can be configured to temporarily boost the output power of cell-specific signals during the change of parameters in order to further lower the risk of radio link failure and dropped calls. That is, according to an embodiment at least one of the radio access network nodes 110*a*, 110*b* is by the network node 200 instructed to temporarily increase power for transmitting at least one of cell-specific reference signals and cell-specific control signals when gradually changing its current beam forming parameters to said desired beam forming parameters.

Four embodiments relating to how the gradual change as initiated in step S106 can be performed will now be disclosed.

According to a first embodiment the gradually change comprises to gradually sweeping the transmission beams from a current direction to a desired direction. In more detail, according to this embodiment the network node 200 is configured to perform step S106*b* as part of initiating the gradual change in step S106:

S106*b*: The network node 200 instructs at least one of the radio access network nodes to gradually change beam pointing from the first direction to the second direction.

The speed of the sweep could dependent on the number of wireless devices 130 for which handover needs to be performed. That is, according to at least the present embodiment the beam pointing is gradually changed from the first direction to the second direction at a speed dependent on the number of wireless devices 130 served by the radio access network nodes 110*a*, 110*b* for which handover needs to be performed.

Figure 4:
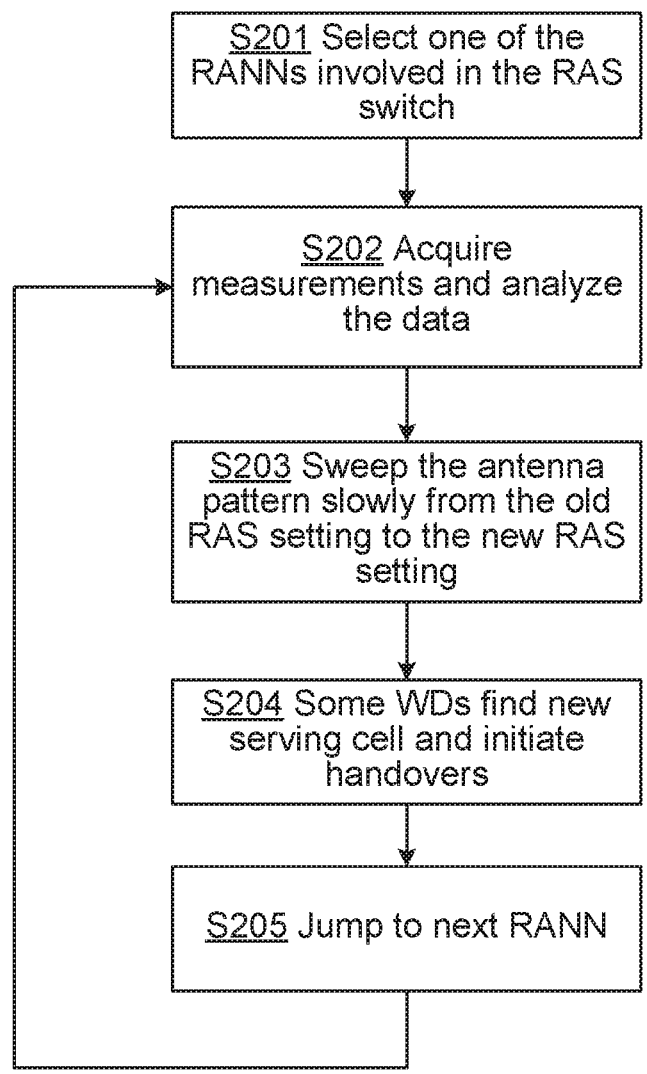

Particular reference is now made to the flowchart of FIG. 4 illustrating details of the current first embodiment.

S201: The network node 200 selects one of the radio access network nodes 110*a*, 110*b* to be involved in the RAS switch.

S202: The network node 200 acquire channel measurements as in step S102 and analyses the channel measurements to determine the desired beam forming parameters as in step S104.

S203: The network node 200 initiates the gradual change by instructing the selected radio access network node to gradually sweep its antenna pattern from its current settings to the desired settings as in step S106*b* so that any wireless devices 130 operatively connected to the selected radio access network node have time to perform handover.

S204: Some wireless devices 130 find a new serving cell and are thus handed over. If settings of more than one selected radio access network node are changed simultaneously, temporary coverage holes might occur during the coverage area switch. How quick the sweep can be depends on how many wireless devices have to perform handover to a new cell during the coverage area switch.

S205: Another of the radio access network nodes 110*a*, 110*b* to be involved in the RAS switch is selected and steps S202-S204 are repeated.

The network node 200 could be configured to keep track of which radio access network nodes that could provide backup coverage to other radio access network nodes. For example if a selected radio access network node only has one radio access network node providing backup and this radio access network node providing backup has changed its radiation pattern, it is not certain that the selected radio access network node still has backup coverage.

According to a second embodiment the gradually change comprises gradually reducing the power of transmission beams of the current settings and gradually increasing the power of transmission beams of the desired settings.

In more detail, according to this embodiment the network node 200 is configured to perform step S106*c* as part of initiating the gradual change in step S106:

S106*c*: The network node 200 instructs at least one of the radio access network nodes 110*a*, 110*b* to gradually reduce power for beam pointing in the first direction and to gradually increase power for beam pointing in the second direction.

How much to reduce the power could depend on the size of the coverage area and where the wireless devices 130 are located within the coverage area. That is, according to at least this second embodiment, how much to reduce power for beam pointing in the first direction could depend on at least one of size of the first transmission beam and how the wireless devices 130 are geographically located.

Figure 5:
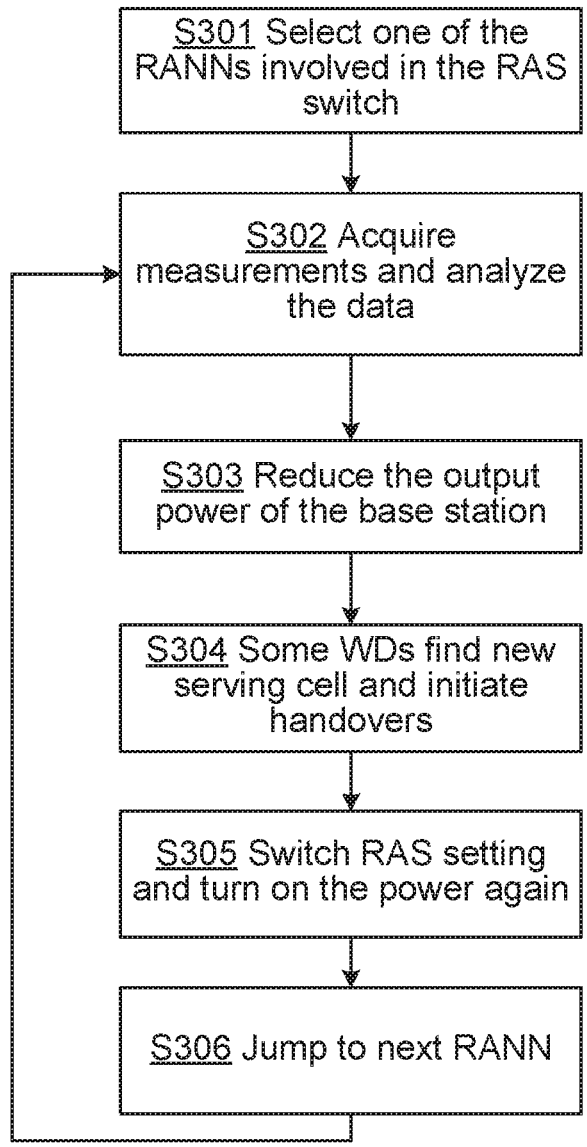

Particular reference is now made to the flowchart of FIG. 5 illustrating details of the current second embodiment.

S301: The network node 200 selects one of the radio access network nodes 110a, 110b to be involved in the RAS switch.

S302: The network node 200 acquire channel measurements as in step S102 and analyses the channel measurements to determine the desired beam forming parameters as in step S104.

S303: The network node 200 initiates the gradual change by instructing the selected radio access network node to gradually reduce its output power as in step S106c so that any wireless devices 130 operatively connected to the selected radio access network node have time to perform handover.

S304: Some wireless devices 130 find a new serving cell and are thus handed over. If settings of more than one selected radio access network node are changed simultaneously, temporary coverage holes might occur during the coverage area switch. How much the output power should be reduced for the selected radio access network node could depend on how large the coverage area change is and how the wireless devices operatively connected to the radio access nodes are located. For example, if some wireless devices are located very close to the selected radio access network node and the coverage area switch is small it is likely that these wireless devices will be operatively connected to the selected radio access network node also after the coverage area switch. By not reducing the output power too much, this wireless devices 130 will be operatively connected to the selected radio access network node during the whole coverage area switch, which will reduce the number of handovers and reduce the risk of radio link failure and dropped calls.

S305: The network node 200 continues initiating the gradual change by instructing the selected radio access network node to switch its settings and gradually increase its output power as in step S106c S306: Another of the radio access network nodes 110a, 110b to be involved in the RAS switch is selected and steps S302-S305 are repeated.

According to a third embodiment the gradually change comprises switching transmissions in different polarizations off and on. In more detail, according to this embodiment the network node 200 is configured to perform step S106d as part of initiating the gradual change in step S106:

S106d: The network node 200 instructs at least one of the radio access network nodes 110a, 110b to switch off transmission using one of the mutually orthogonal polarizations for the first transmission beam, then to switch on transmission using this one of the mutually orthogonal polarizations for the second transmission beam, then to switch off transmission using the other of the mutually orthogonal polarizations for the first transmission beam, and then to switch on transmission using the other of the mutually orthogonal polarizations for the second transmission beam.

In relation thereto, the network node 200 could instructs the at least one of the radio access network nodes 110a, 110b to slowly reduce the output power of the beam of the second polarization. That is, according to at least this third embodiment at least one of the radio access network nodes 110a, 110b is instructed to gradually reduce power of the first transmission beam before switching off transmission using the other of the mutually orthogonal polarizations for the first transmission beam.

Figure 1C:
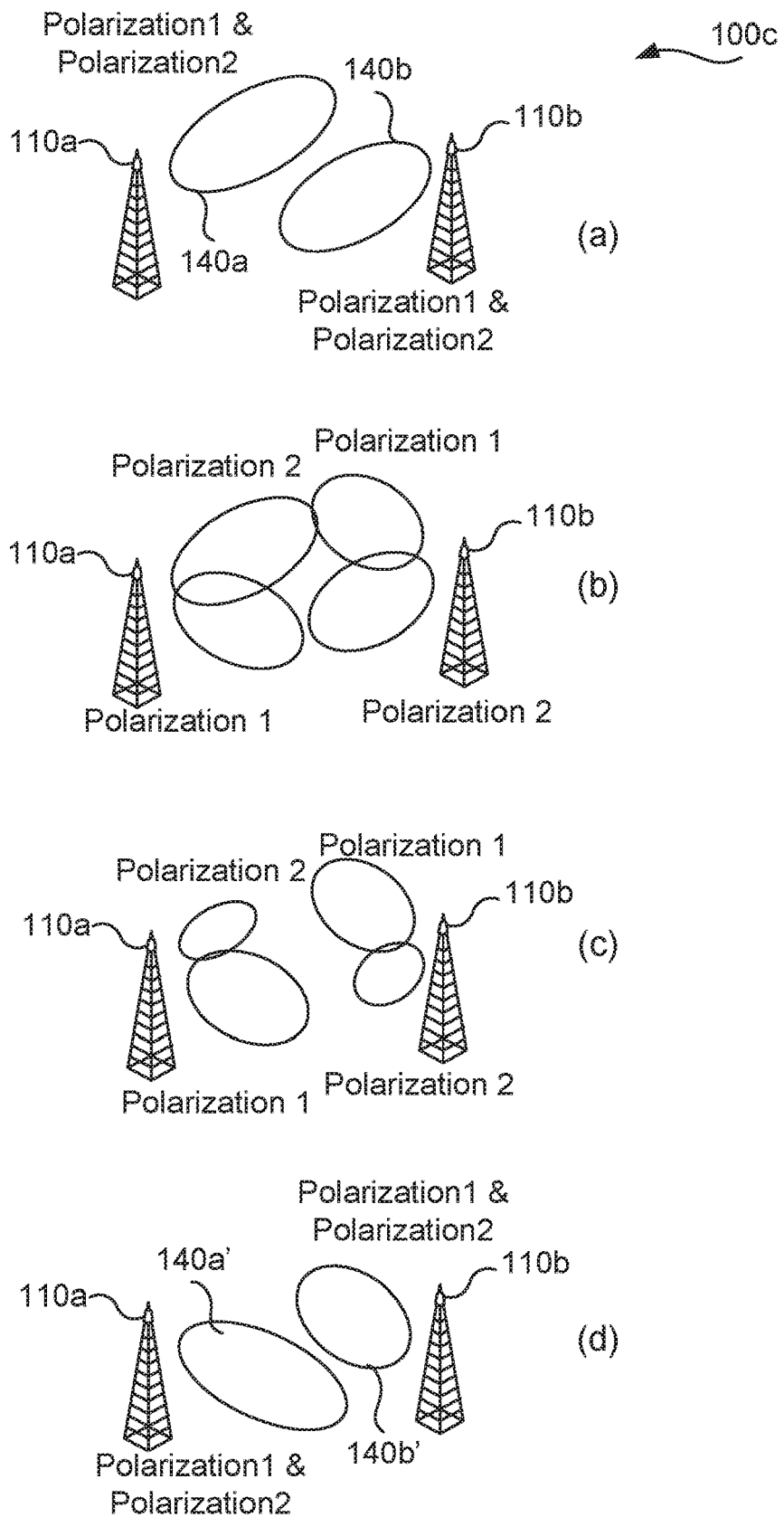
Figure 6:
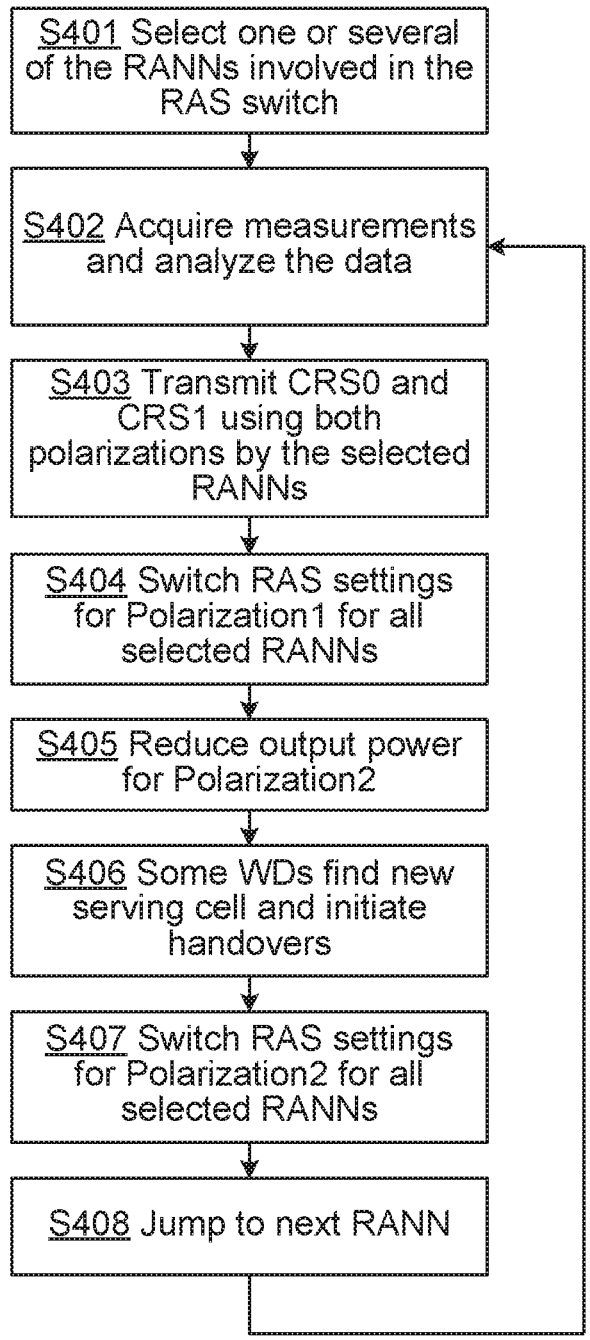

Particular reference is now made to the flowchart of FIG. 6 illustrating details of the current third embodiment. Parallel reference is also made to the communications network 100c of FIG. 1c. The communications network 100c comprises a first radio access network node 110a and a second radio access network node 110b. At (a) the first radio access network node 110a and the second radio access network node 110b transmits in transmission beams 140a and 140b, respectively, both using a first polarization ("Polarization 1") and a second polarization ("Polarization 2").

S401: The network node 200 selects one or more of the radio access network nodes 110a, 110b to be involved in the RAS switch. In the illustrative example of FIG. 1c the radio access network node 110a is identified as the selected radio access network node.

S402: The network node 200 acquire channel measurements as in step S102 and analyses the channel measurements to determine the desired beam forming parameters as in step S104.

S403: The network node 200 initiates the gradual change by instructing the selected one or more radio access network nodes to transmit CRS0 and CRS1 using both polarizations (FIG. 1c at (b)). One reason for this is that some wireless devices 130 might use both CRS0 and CRS1 for mobility measurements. The polarization diversity gain for CRS and cell-specific control signals when transmitting on both polarizations will be lost when one of the polarizations is steered away, which might lead to coverage holes and therefore dropped calls. However, this could at least partially be solved by temporarily boosting the output power of the CRS signals and cell-specific control signals during the switch of the antenna parameter settings. Boosting CRS signals and cell-specific control signals will have minor effect on the output power of the data signals due to the fact that CRS and cell-specific control signals only occupy a small fraction of the total available radio resources. For legacy wireless devices 130 the CRSs are also used for determining precoding matrix, rank and modulation and coding scheme for downlink data transmission. For non-legacy wireless devices the channel state information Reference Signal (CSI-RS) is used to determining precoding matrix, rank and modulation and coding scheme for downlink data transmission. Therefore, in case there are any served non-legacy wireless devices 130 the coverage area of the CSI-RSs is also changed. The coverage area switch for the CSI-RSs could be done simultaneously and in similar fashion as described for the CRSs.

S404: The network node 200 continues initiating the gradual change by instructing the selected one or more radio access network nodes to switch off transmission using one of the mutually orthogonal polarizations for the first transmission beam as in step S106c so that any wireless devices 130 operatively connected to the selected radio access network node have time to perform handover. First the beam for one polarization of the selected one or more radio access network nodes switches from the old RAS settings to the new RAS settings while the beam for the second polarization still remains in the old RAS setting.

S405: The network node 200 continues initiating the gradual change by instructing the selected one or more radio access network nodes to gradually reduce the output power of the transmission beam of the second polarization. Before the power is reduced for the second polarization the coverage hole that existed has to be covered (FIG. 1c at (c)).

S406: Some wireless devices 130 find a new serving cell and are thus handed over.

S407: The network node 200 continues initiating the gradual change by instructing the selected one or more radio access network nodes to switch the RAS setting also for the second polarization (FIG. 1c at (d)).

S408: At least one other one or more of the radio access network nodes 110a, 110b to be involved in the RAS switch is selected and steps S402-S407 are repeated.

According to a fourth embodiment the gradually change comprises gradually increasing the cell defined by the current settings to cover both current and desired settings, and then to reducing the cell to cover only the desired settings. In more detail, according to this embodiment the network node 200 is configured to perform step S106e as part of initiating the gradual change in step S106:

S106e: The network node 200 instructs at least one of the radio access network nodes 110a, 110b to gradually increase size of the first transmission beam until the first transmission beam covers both the first transmission beam and the second transmission beam and then to gradually decrease the size until the first transmission beam covers only the second transmission beam, thereby gradually changing the first transmission beam into the second transmission beam.

Figure 1D:
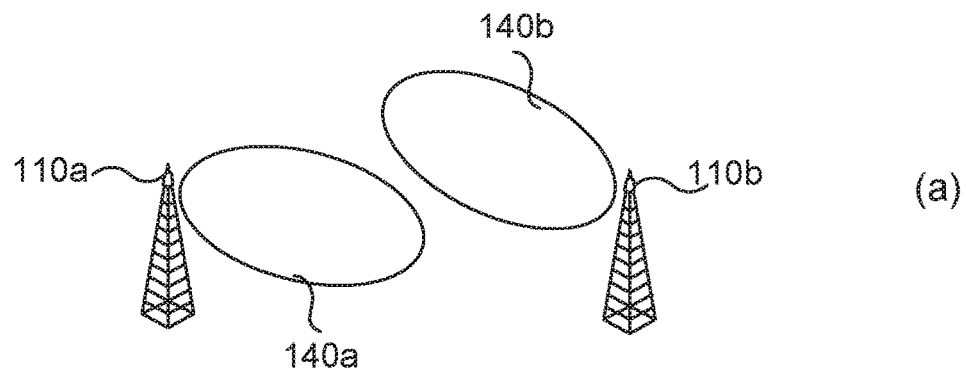
Figure 1D:
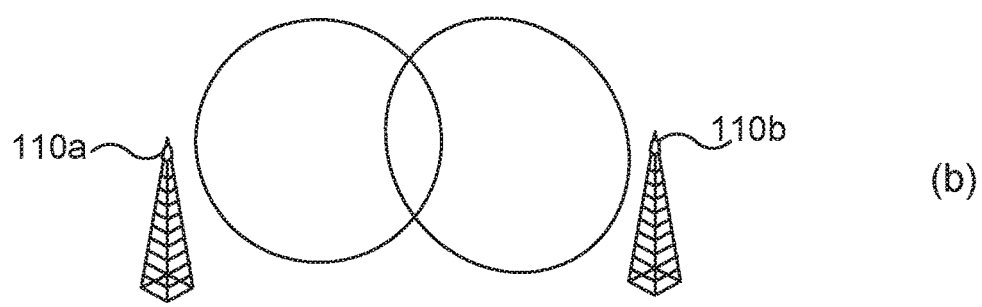
Figure 1D:
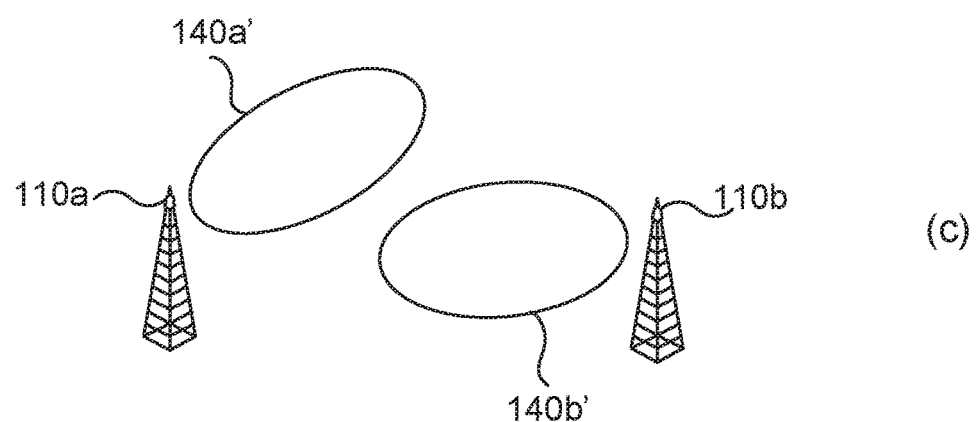
Figure 7:
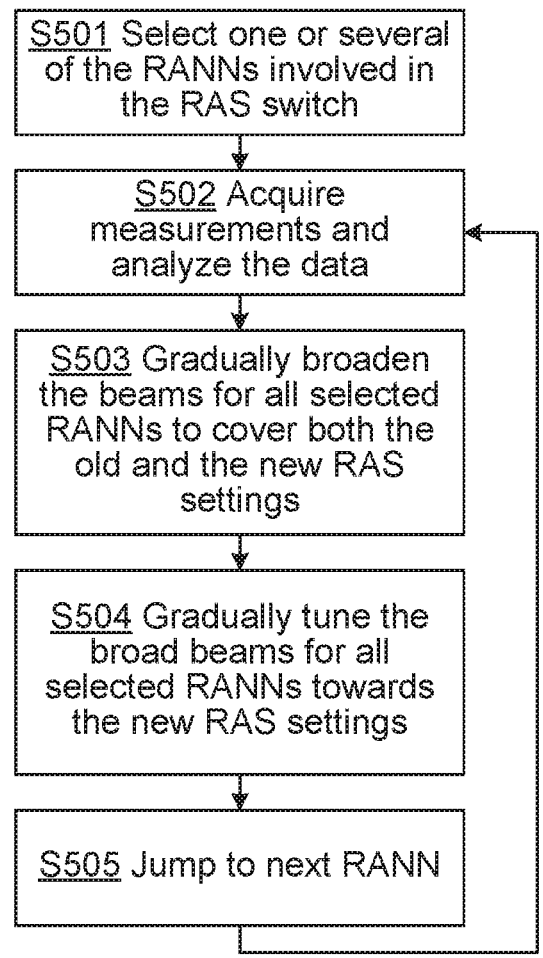

Particular reference is now made to the flowchart of FIG. 7 illustrating details of the current fourth embodiment. Parallel reference is also made to FIG. 1d. The communications network 100d comprises a first radio access network node 110a and a second radio access network node 110b. At (a) the first radio access network node 110a and the second radio access network node 110b transmits in transmission beams 140a and 140b, respectively.

S501: The network node 200 selects one or more of the radio access network nodes 110a, 110b to be involved in the RAS switch. In the illustrative example of FIG. 1d the radio access network node 110a is identified as the selected radio access network node.

S502: The network node 200 acquire channel measurements as in step S102 and analyses the channel measurements to determine the desired beam forming parameters as in step S104.

S503: The network node 200 initiates the gradual change by instructing the selected one or more radio access network node to gradually increase size of the first transmission beam until the first transmission beam covers both the first transmission beam and the second transmission beam as in step S106e so that any wireless devices 130 operatively connected to the selected radio access network node have time to perform handover (FIG. 1d at (b)). The beams for the selected one or more radio access network nodes are thus broaden to cover both the old RAS setting and the new RAS setting. Broadening the beam will lead to reduced antenna gain which will reduce the path gain for wireless devices served by the selected one or more radio access network nodes. However, this could at least partially be solved by temporarily boosting the output power of the CRS signals and cell-specific control signals during the switch of the antenna parameter settings. Boosting CRS signals and cell-specific control signals will have minor effect on the output power of the data signals due to the fact that CRS and cell-specific control signals only occupy a small fraction of the total available radio resources.

S504: The network node 200 continues initiating the gradual change by instructing the selected one or more radio access network nodes to gradually decrease the size until the first transmission beam covers only the second transmission beam, thereby gradually changing the first transmission beam into the second transmission beam, as in step S106e (FIG. 1d at (c)). Some wireless devices 130 find a new serving cell and are thus handed over.

S505: At least one other one or more of the radio access network nodes 110a, 110b to be involved in the RAS switch is selected and steps S502-S504 are repeated.

Figure 8:
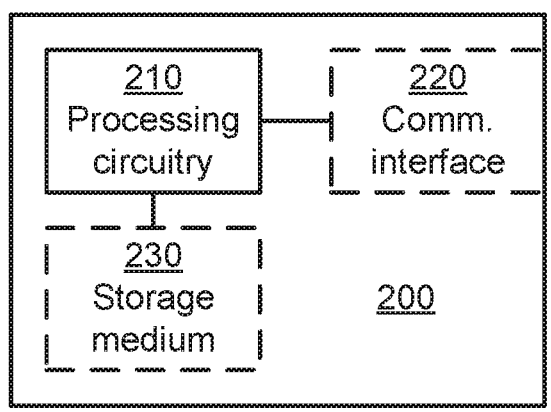
FIG. 8 is a schematic diagram showing functional units of a network node 200 according to an embodiment.

FIG. 8 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with a wireless device 130, with a radio access network node 110a, 110b, and/or a central server 150. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 9:
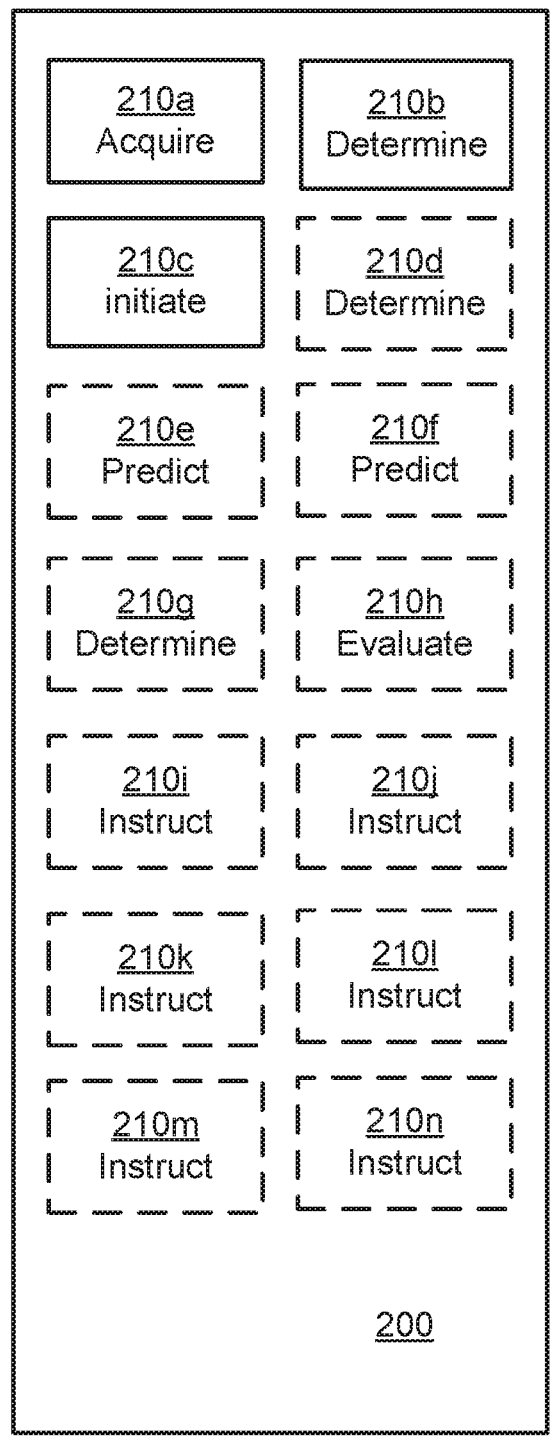
FIG. 9 is a schematic diagram showing functional modules of a network node 200 according to an embodiment.

FIG. 9 schematically illustrates, in terms of a number of functional modules, the components of a network node 200 according to an embodiment. The network node 200 of FIG. 9 comprises a number of functional modules; an acquire module 210a configured to perform step S102, a determine module 210b configured to perform step S104, and an initiate module 210c configured to perform step S106. The network node 200 of FIG. 9 may further comprises a number of optional functional modules, such as any of a determine module 210d configured to perform step S104a, a predict module 210e configured to perform step S104b, a predict module 210f configured to perform step S104c, a determine module 210g configured to perform step S104d, an evaluate module 210h configured to perform step S104e, an instruct module 210i configured to perform step S106a, an instruct module 210j configured to perform step S106b, an instruct module 210k configured to perform step S106c, an instruct module 210l configured to perform step S106d, an instruct module 210m configured to perform step S106e, and an instruct module 210n configured to perform step S106f.

In general terms, each functional module 210a-210n may in one embodiment be implemented only in hardware or and in another embodiment with the help of software, i.e., the latter embodiment having computer program instructions stored on the storage medium 230 which when run on the processing circuitry makes the network node 200 perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210a-210n may be implemented by the processing circuitry 210, possibly in cooperation with functional units 220 and/or 230. The processing circuitry 210 may thus be configured to from the storage medium 230 fetch instructions as provided by a functional module 210a-210n and to execute these instructions, thereby performing any steps as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. In this respect, at least part of the network node 200 may reside in the radio access network, such as in the radio access network node, for cases when embodiments as disclosed herein are performed in real time. Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 8 the processing circuitry 210 may be distributed among a plurality of devices, or nodes. The same applies to the functional modules 210a-210n of FIG. 9 and the computer program 1020 of FIG. 10 (see below).

Figure 10:
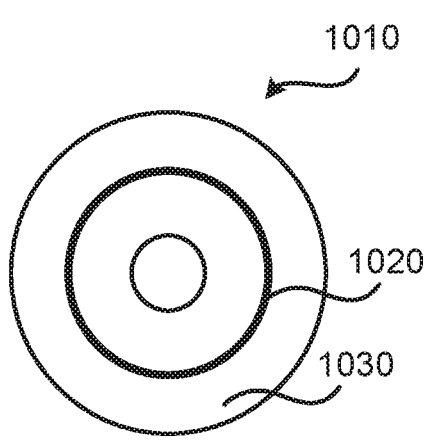
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for shaping transmission beams in a wireless communications network, the method being performed by a network node, the method comprising:
   acquiring channel measurements from wireless devices served by radio access network nodes using current beam forming parameters and being controlled by the network node;
   determining, based on the channel measurements, desired beam forming parameters for shaping the transmission beams for at least one of the radio access network nodes; and
   initiating a gradual change of the current beam forming parameters to the desired beam forming parameters for shaping the transmission beams for the at least one of the radio access network nodes,
   wherein the gradual change causes a need for network controlled handover to occur for at least some of the wireless devices served by the radio access network nodes, and
   wherein initiating the gradual change comprises instructing the at least one of the radio access network nodes to initiate handover of those of the at least some of the wireless devices that are served by the at least one of the radio access network nodes.

2. The method according to claim 1, wherein the current beam forming parameters are associated with beam pointing in a first direction, and wherein the desired beam forming parameters are associated with beam pointing in a second direction different from the first direction.

3. The method according to claim 2, wherein the first direction is covered by a first transmission beam as generated by the current beam forming parameters, wherein the second direction is covered by a second transmission beam as generated by the desired beam forming parameters.

4. The method according to claim 3, wherein the first transmission beam and the second transmission beam are transmitted using mutually orthogonal polarizations.

5. The method according to claim 4, wherein initiating the gradual change comprises:
   instructing the at least one of the radio access network nodes to switch off transmission using one of the mutually orthogonal polarizations for the first transmission beam, then to switch on transmission using the one of the mutually orthogonal polarizations for the second transmission beam, then to switch off transmission using the other of the mutually orthogonal polarizations for the first transmission beam, and then to switch on transmission using the other of the mutually orthogonal polarizations for the second transmission beam.

6. The method according to claim 5, wherein the at least one of the radio access network nodes is instructed to gradually reduce power of the first transmission beam before switching off transmission using the other of the mutually orthogonal polarizations for the first transmission beam.

7. The method according to claim 3, wherein the first transmission beam and the second transmission beam are a result of an initial transmission beam covering at least partly the first transmission beam and the second transmission beam having been split.

8. The method according to claim 7, wherein one of the first transmission beam and the second transmission beam has same physical cell identifier as the initial transmission beam.

9. The method according to claim 3, wherein how much to reduce power for beam pointing in the first direction depends on at least one of size of the first transmission beam and how the wireless devices are geographically located.

10. The method according to claim 3, wherein initiating the gradual change comprises:
instructing the at least one of the radio access network nodes to gradually increase size of the first transmission beam until the first transmission beam covers both the first transmission beam and the second transmission beam and then to gradually decrease the size until the first transmission beam covers only the second transmission beam, thereby gradually changing the first transmission beam into the second transmission beam.

11. The method according to claim 2, wherein initiating the gradual change comprises:
instructing the at least one of the radio access network nodes to gradually change beam pointing from the first direction to the second direction.

12. The method according to claim 11, wherein the beam pointing is gradually changed from the first direction to the second direction at a speed dependent on number of wireless devices served by the radio access network nodes for which handover needs to be performed.

13. The method according to claim 2, wherein initiating the gradual change comprises:
instructing the at least one of the radio access network nodes to gradually reduce power for beam pointing in the first direction and to gradually increase power for beam pointing in the second direction.

14. The method according to claim 1, wherein initiating the gradual change further comprises:
instructing the at least one of the radio access network nodes to gradually change its current beam forming parameters to the desired beam forming parameters.

15. The method according to claim 14, wherein at least two of the radio access network nodes are instructed, and wherein the at least two of the radio access network nodes are instructed to change their current beam forming parameters to the desired beam forming parameters one at a time.

16. The method according to claim 14, wherein at least two of the radio access network nodes are instructed, and wherein all of the at least two of the radio access network nodes are instructed to simultaneously change its current beam forming parameters to the desired beam forming parameters.

17. The method according to claim 1, wherein the channel measurements are based on uplink sounding signals.

18. The method according to claim 1, wherein determining the desired beam forming parameters comprises:
determining spatial channel characteristics from the channel measurements.

19. The method according to any claim 18, wherein the spatial channel characteristics for each of the at least one of the radio access network nodes are represented by antenna covariance matrix for all antenna ports of the at least one of the radio access network nodes.

20. The method according to claim 1, wherein the current beam forming parameters and the desired beam forming parameters are provided as beam forming weight vectors.

21. The method according to claim 1, wherein determining the desired beam forming parameters comprises:
predicting which of the wireless devices that need to be handed over due to the current beam forming parameters being gradually changed.

22. The method according to claim 1, wherein determining the desired beam forming parameters comprises:
predicting signal strengths of the wireless devices as if the desired beam forming parameters would have been used, without deploying the desired beam forming parameters; and
determining an order for handing over the wireless devices according to the signal strengths.

23. The method according to claim 1, wherein determining the desired beam forming parameters comprises:
evaluating network coverage probability if the desired beam forming parameters would have been used, without deploying the desired beam forming parameters, and
wherein the desired beam forming parameters are determined such that at least a predetermined share of the wireless devices is in service coverage.

24. The method according to claim 1, wherein the at least one of the radio access network nodes is instructed to temporarily increase power for transmitting at least one of cell-specific reference signals and cell-specific control signals when gradually changing its current beam forming parameters to the desired beam forming parameters.

25. A network node for shaping transmission beams in a wireless communications network, the network node comprising:
processing circuitry; and
a storage medium coupled with the processing circuitry, wherein the storage medium stores instructions that, when executed by the processing circuitry, causes the network node to:
acquire channel measurements for wireless devices served by radio access network nodes using current beam forming parameters and being controlled by the network node;
determine, based on the channel measurements, desired beam forming parameters for shaping the transmission beams for at least one of the radio access network nodes; and
initiate a gradual change of the current beam forming parameters to the desired beam forming parameters for shaping the transmission beams for the at least one of the radio access network nodes,
wherein the gradual change causes a need for network controlled handover to occur for at least some of the wireless devices served by the radio access network nodes, and
wherein causing the network node to initiate the gradual change comprises causing the network node to instruct the at least one of the radio access network nodes to initiate handover of those of the at least some of the wireless devices that are served by the at least one of the radio access network nodes.

26. A non-transitory computer-readable medium having instructions stored therein that are executable by processing circuitry of a network node to cause the network node to:

acquire channel measurements for wireless devices served by radio access network nodes using current beam forming parameters and being controlled by the network node;

determine, based on the channel measurements, desired beam forming parameters for shaping the transmission beams for at least one of the radio access network nodes; and initiate a gradual change of the current beam forming parameters to the desired beam forming parameters for shaping the transmission beams for the at least one of the radio access network nodes, wherein the gradual change causes a need for network controlled handover to occur for at least some of the wireless devices served by the radio access network nodes, and wherein causing the network node to initiate the gradual change comprises causing the network node to instruct the at least one of the radio access network nodes to initiate handover of those of the at least some of the wireless devices that are served by the at least one of the radio access network nodes.

\* \* \* \* \*